United States Patent [19]

Kawanami et al.

[11] Patent Number: 4,544,984
[45] Date of Patent: Oct. 1, 1985

[54] COAXIAL LIGHTNING ARRESTING STRUCTURE

[75] Inventors: Norihide Kawanami; Yukinori Miyake; Kenji Kawamura, all of Tokyo; Toshiharu Toda, Mitaka, all of Japan

[73] Assignees: Hirose Electric Co., Ltd., Tokyo; Mito Teck Co., Ltd., Ibaragi, both of Japan

[21] Appl. No.: 505,853

[22] Filed: Jun. 20, 1983

[30] Foreign Application Priority Data

Jun. 23, 1982 [JP] Japan ................. 57-107780

[51] Int. Cl.⁴ .................................... H02H 3/22
[52] U.S. Cl. ..................... 361/119; 361/120
[58] Field of Search ........... 361/117, 119, 120, 110, 361/111

[56] References Cited

U.S. PATENT DOCUMENTS

| 2,886,744 | 5/1959 | McNatt, Jr. | 361/119 |
| 3,274,447 | 9/1966 | Nelson | 361/119 |
| 3,863,111 | 1/1975 | Martzloff | 361/119 |
| 4,145,729 | 3/1979 | Hayward | 361/119 |
| 4,359,764 | 11/1982 | Block | 361/119 |

Primary Examiner—Harry E. Moose, Jr.
Attorney, Agent, or Firm—Fleit, Jacobson, Cohn & Price

[57] ABSTRACT

There is disclosed a coaxial lightning arresting structure comprising an inner conductor, an outer conductor surrounding the inner conductor and an arrester tube located between the inner and outer conductors perpendicularly to the direction of transmission and connected at its ends to the inner and outer conductors, respectively. The portion of the outer conductor provided with the arrester tube has an equivalently substantially increased inner diameter as compared with the other portions of the outer conductor so that the ratio of the inner diameter of the outer conductor portion having said increased diameter to the inner conductor outer diameter is greater than the ratio of the outer conductor inner diameter at the other portions thereof to the inner conductor outer diameter which latter ratio provides the coaxial transmission line with a given characteristic impedance.

5 Claims, 6 Drawing Figures

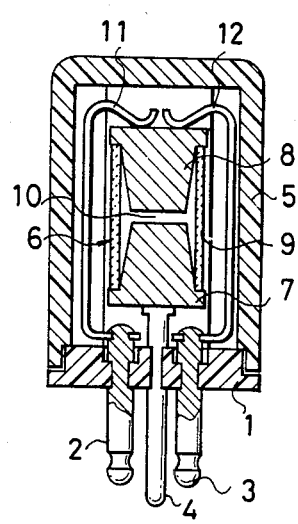
FIG.1
PRIOR ART
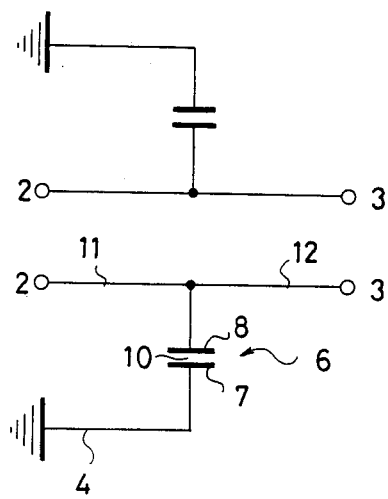
FIG.2
PRIOR ART
FIG.3
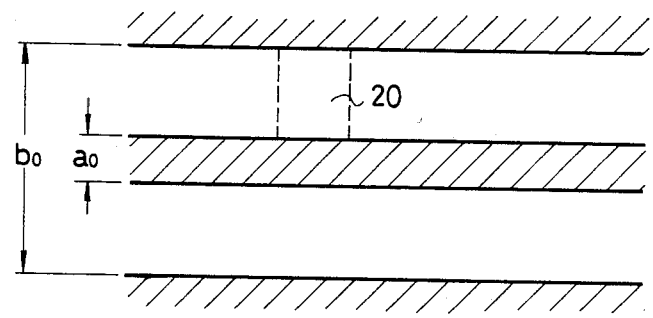

COAXIAL LIGHTNING ARRESTING STRUCTURE

This invention relates to a lightning arresting device, and more specifically to a coaxial lightning arresting structure for use in coaxial transmission lines.

Heretofore, protectors or lightning arresters having a structure like that shown in FIG. 1 have been generally used in signal transmission lines. The arrester shown comprises a base plate 1 having an input signal terminal 2, an output signal terminal 3 and a grounding pin 4 which are fixed thereto and extend therethrough. The arrester also has a cap 5 fitted on the base plate 1. A gas filled type arrester tube 6 is located in a space defined by the base plate 1 and the cap 5, and a lower electrode 7 of the arrester tube 6 is put on and contacted with an upper end portion of the grounding pin 4. The arrester tube 6 has an upper electrode 8 in addition to the electrode 7. These electrodes 7 and 8 are supported by a ceramic tube 9 to leave therebetween a gap 10 which is set to provide a desired discharge start voltage. The upper electrode 8 is contacted with a pair of conductive springs 11 and 12 extending respectively from the upper end portions of the signal terminals 2 and 3 so that these signal terminals 2 and 3 are connected to each other by the electrode 8.

The aforementioned device constitutes one arrester unit, and the arrester comprises a pair of such arrester units so that it can be used for a two-conductor transmission line. An equivalent circuit of such an arrester is shown in FIG. 2.

When the arrester as mentioned above is applied to a transmission line, a pair of signal wires in the transmission line are interrupted and the signal terminals 2 and 3 of an arrester are connected to each of the interrupted signal wires to restore the electrical continuity thereof. At the same time, the grounding pins 4 of the arrester are earthed. In normal operation, a signal transmitted through the signal wire is inputted from the input signal terminal 2 of the arrester through the conductive spring 11 and the electrode 8 of the arrester tube and is outputted through the conductive spring 12 and the output signal terminal 3 so as to be returned to the signal wire. However, if lightning strikes near the transmission line, a high voltage surge current induced in the transmission line will flow through the signal wire to the input signal terminal 2 of the arrester. The high voltage surge current is guided through the conductive spring 11 to the electrode 8 where it causes electric discharge between the electrodes 7 and 8 separated by the gap 10. As a result, the surge current will be dispersed into the earth through the grounding pin 4. Therefore, no surge current is returned through the output signal terminal 3 to the transmission line so that electronic instruments connected to the transmission line are protected from the surge current.

The aforementioned arrester is suitable for transmission lines for signals of a few thousand Hertz, but cannot be used for a high-frequency coaxial signal transmission line. The reason for this is that: First, the overall arrester has a considerable amount of capacitance. Second, if the arrester as shown is applied for the coaxial transmission line, it is necessary to provide a drawing-out conductor extending from at least a central conductor of the coaxial line and to connect the drawing-out conductor to the signal terminal of the arrester. However, this inevitably makes the connection very complicated and will greatly change the impedance of the coaxial line, which becomes a cause for reflection in the transmission line. For these reasons, there has heretofore been no arrester which could be used in a high-frequency coaxial signal transmission line.

Accordingly, an object of this invention is to provide a small-sized and inexpensive lightning arresting structure which can be used in a coaxial signal transmission line and which has sufficient high-frequency characteristics.

The inventors of this invention considered locating an arrester tube in a coaxial line but not providing an arrester exterior of the coaxial line. However, a coaxial line is a distributed constant circuit. Therefore, if an arrester tube having some amount of capacitance is connected to the coaxial line, that portion of the coaxial line to which the arrester tube is connected will have a capacitance different from that of the other portions of the coaxial line, so that the characteristic impedance will be changed in that portion. This is a cause for reflection in the transmission line and impairs the voltage standing wave ratio (VSWR) of the transmission line.

Now, considering a coaxial line as shown in FIG. 3, which comprises an inner conductor having an outer diameter of "Ao" and an outer conductor having an inner diameter of "bo", the characteristic impedance Zo is expressed as follows:

$$Z_o = \sqrt{\frac{L_o}{C_o}}$$

where $$L_o = \frac{\mu}{2\pi} \log_e \frac{bo}{Ao} \ [H/m]$$

$$C_o = \frac{2\pi\epsilon}{\log_e \frac{bo}{Ao}} \ [F/m]$$

$\mu$: permeability
$\epsilon$ = dielectric constant

Furthermore, considering a specific coaxial line having the characteristic impedance of 50 ohms, it has for example the following Lo and Co:

Lo=0.00135 $\mu$H/m
Co=0.52 pF/m

In such a coaxial line, if an arrester tube 20 having at least a few picofarads of capacitance is located as shown in dotted lines in FIG. 3, the capacitance will be increased in that portion where the arrester tube is located. For example, assuming that the arrester tube 20 has a capacitance of 2.5 pF, that portion of the coaxial line provided with the arrester tube will have a capacitance of about 3 pF, which is six times the capacitance of a coaxial line provided with no arrester tube. As a result, the portion of the coaxial line provided with the arrester tube will have a characteristic impedance of about 20 ohms.

Thus, the inventors of this invention have made a unique contrivance for compensating for the increase in the electrostatic capacitance caused by provision of an arrester tube in a coaxial transmission line.

Namely, according to this invention there is provided a coaxial lightning arresting structure comprising an inner conductor, an outer conductor surrounding the inner conductor and an arrester tube located between the inner and outer conductors perpendicularly to the direction of transmission and connected at its ends to the inner and outer conductors, respectively, the portion of said outer conductor provided with the arrester tube having an equivalently substantially increased inner diameter as compared with the other portions of the outer conductor so that the ratio of the inner diameter of said outer conductor portion having said increased inner diameter to the inner conductor outer diameter is greater than the ratio of the outer conductor inner diameter at the other portions thereof to the inner conductor outer diameter, which latter ratio provides the coaxial transmission line with a given characteristic impedance.

With the above arrangement, the coaxial structure portion having the outer conductor of the equivalently substantially increased inner diameter has an increased inductance and a somewhat decreased capacitance. Therefore, the increase in electrostatic capacitance in the coaxial transmission line portion provided with the arrester tube is compensated for by the increase in inductance and the decrease in capacitance in the coaxial structure itself of the portion provided with the arrester tube, so that the coaxial transmission line portion provided with the arrester tube can have substantially the same characteristic impedance as that of the other portion.

In one embodiment of this invention, the outer conductor portion having the equivalently substantially increased inner diameter is an outer conductor portion formed with a large hole surrounding the arrester tube. In addition, the outer conductor portion may be a cap which is fitted in an arrester tube insertion hole formed in the outer conductor and which cap has a hole for accommodating therein a portion of the arrester tube and having a tapered inner surface formed at the lower portion thereof to diverge toward the inner conductor.

The above and other objects and advantages of this invention will become apparent from the following detailed description of a preferred embodiment of this invention with reference to the accompanying drawings, in which:

FIG. 1 is sectional view of the conventional arrester;

FIG. 2 shows the equivalent circuit of the arrester shown in FIG. 1;

FIG. 3 is a diagramatic sectional view of an exemplary coaxial line;

Figure 4:
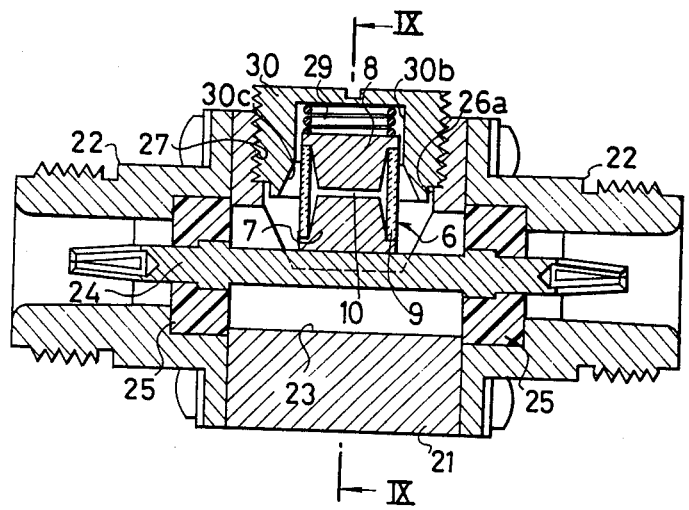
FIG. 4 is a longitudinal sectional view of a first embodiment of the coaxial lightning arresting structure in accordance with this invention.
Figure 5:
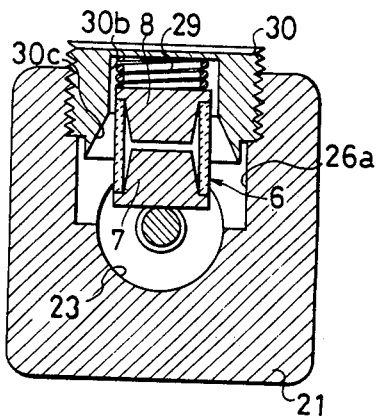
FIG. 5 is a sectional view taken along the line V—V in FIG. 4.

Referring to FIGS. 4 and 5, there is shown a coaxial connector incorporating therein the coaxial lightning arresting structure in accordance with this invention. The shown connector type coaxial arresting structure has an outer conductor 21 connected to and supported by metallic coaxial connector portions 22 which are provided at opposite ends of the outer conductor 21 and are adapted to be coupled with mating connectors (not shown). The outer conductor 21 has a circular through-hole 23. A thin inner conductor 24 is located to coaxially extend through the hole 23 of the outer conductor 21 and is supported at each end by one of the connector portions 22 via a dielectric member 25 which acts as a support and separator.

As shown in the drawings, the outer conductor 21 is of a considerable thickness and has an arrester tube insertion through hole 26 formed in an upper portion thereof. The inner diameter of the through-hole 26 is much larger than the outer diameter of a gas filled arrester tube 6 inserted therein. The insertion hole 26 downwardly extends to a position corresponding to the center axis of the inner conductor such that the center axis of the insertion hole 26 is substantially perpendicular to the center axis of the inner conductor. The insertion hole 26 has a female-threaded portion 27 formed in an upper portion thereof. In addition, a conductive screw cap 30 is screwed into the threaded portion 27. This screw cap 30 is in the form of a cylindrical member having a hole 30b open to the lower end toward the inner conductor 24 and adapted to accommodate therein a portion of the arrester tube in relatively close-fitting relationship as shown in FIGS. 4 and 5. The hole 30b has a tapered surface 30c formed at the lower portion thereof to diverge downwardly.

The arrester tube 6 is inserted into the insertion hole 26 and positioned on the inner conductor 24 so that a lower electrode 7 of the arrester tube 6 is brought into contact with the inner conductor 24. A conductive spring coil 29 is put on an upper electrode 8 of the arrester tube 6 and the cylindrical screw cap 30 is screwed in the threaded portion 27 of the insertion hole 26 so as to accommodate the spring coil 29 and a portion of the arrester tube in the hole 30b thereof and so as to downwardly push the upper electrode 8 of the arrester tube 6 through the spring coil 29. Thus, the lower electrode 7 of the arrester tube 6 is electrically connected to the inner conductor 24, and the upper electrode 8 of the arrester tube 6 is electrically connected to the outer conductor 21 through the spring washer 29 and the conductive cap 30.

Figure 6:
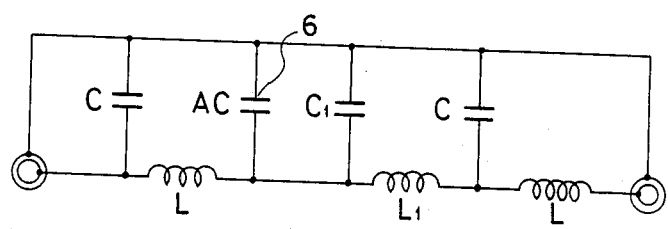
FIG. 6 shows the equivalent circuit of the device shown in FIGS. 4 and 5.

With the above construction, the distance between the inner conductor 24 and the surface of the portion in the neighborhood of the arrester tube and acting as the outer conductor is large. Therefore, as seen from FIG. 6 showing the equivalent circuit of the shown arresting structure, the increased distance between the inner conductor and the outer conductor provides an increased inductance $L_1$ and a somewhat decreased capacitance $C_1$ in the coaxial structure portion to be provided with the arrester tube, so that the increased inductance and the decreased capacitance compensate for the addition of the capacitance "AC" by the provision of the arrester tube.

With adjustment of the screw cap 30, it is possible to increase and decrease the distance between the inner conductor and the screw cap acting as the outer conductor in the neighborhood of the arrester tube, thereby changing the inductance and the capacitance in the coaxial structure portion itself provided with the arrester tube. Namely, the inductance and the capacitance in the coaxial structure portion provided with the arrester tube can be freely and finely adjusted by adjusting the screw cap 30. This is a very convenient feature since the impedance of the coaxial structure portion provided with the arrester tube can be precisely matched with that of the other portions of the coaxial structure.

In addition, by changing the diameter and the depth of the insertion hole 26 and also by changing the angle and the axial length of the tapered surface 30c, it is possible to change the inductance and the capacitance in the coaxial structure portion itself provided with the arrester tube.

In the above explanation, this invention has been described with reference to a connector type coaxial lightning arresting structure, but it will be apparent to those skilled in the art that this invention can also be applied to ordinary coaxial lines or circuits.

We claim:

1. A coaxial lightning arresting structure comprising an inner conductor, an outer conductor surrounding the inner conductor and an arrester tube located between portions of the inner and outer conductors perpendicularly to the direction of transmission and connected at its ends to the inner and outer conductors, respectively, the portion of said outer conductor provided with the arrester tube having an equivalently substantially increased inner diameter as compared with the other portions of the outer conductor so that the ratio of the inner diameter of said outer conductor portion having said increased inner diameter to the inner conductor outer diameter is greater than the ratio of the outer conductor inner diameter at the other portions thereof to the inner conductor outer diameter, which latter ratio provides the coaxial transmission line with a given characteristic impedance, said outer conductor portion having the equivalently substantially increased inner diameter also being provided with a through-hole which is relatively large with respect to the arrester tube, for insertion of the arrester tube into the lightning arresting structure such that the through-hole surrounds the inserted arrester tube, and a cylindrical cap member being fitted in said arrester tube insertion hole formed in the outer conductor portion, said cap member being formed with a hole opening toward the inner conductor for accommodating a portion of the arrester tube in said cap member in relatively close-fitting relationship.

2. A coaxial lightning arresting structure according to claim 1, wherein said hole of said cylindrical cap member has a tapered inner surface diverging toward the inner conductor.

3. A coaxial lightning arresting structure according to claim 2, wherein said arrester tube insertion hole has a female-threaded portion formed in an upper portion thereof, said cylindrical cap member is a screw cap and said screw cap is screwed into said female-threaded portion.

4. A coaxial lightning arresting structure comprising an inner conductor, an outer conductor surrounding the inner conductor and an arrester tube located between portions of the inner and outer conductors perpendicularly to the direction of transmission and connected at its ends to the inner and outer conductors, respectively, the portion of said outer conductor provided with the arrester tube having an equivalently substantially increased inner diameter as compared with the other portions of the outer conductor so that the ratio of the inner diameter of said outer conductor portion having said increased inner diameter to the inner conductor outer diameter is greater than the ratio of the outer conductor inner diameter at the other portions thereof to the inner conductor outer diameter, which latter ratio provides the coaxial transmission line with a given characteristic impedance, said outer conductor portion having the equivalently substantially increased inner diameter being a cap member which is fitted within an arrester tube insertion hole formed in the outer conductor and which has a hole opening toward the inner conductor for accommodating a portion of the arrester tube in said cap member in relatively close-fitting relationship.

5. A coaxial lightning arresting structure according to claim 4, wherein said hole of said cap member has a tapered inner surface diverging toward the inner conductor.

* * * * *